United States Patent Office 3,075,942
Patented Jan. 29, 1963

1

3,075,942
COAL ACID RESINS
Keith B. Bozer, Robert S. Montgomery, and Wesley L. Archer, Midland, Mich., assignors to The Dow Chemical Company, Midland, Mich., a corporation of Delaware
No Drawing. Filed Feb. 4, 1960, Ser. No. 6,615
7 Claims. (Cl. 260—37)

The present invention relates to improved resinous compositions and more particularly it relates to thermosetting resinous compositions of coal acids and polyfunctional amines or alcamines, modified with a monofunctional lower carboxylic acid.

In United States Letters Patents Nos. 2,895,934 and 2,895,936, Archer et al. teach that an efficacious binder for a wide variety of inert filler substances can be prepared from water-soluble coal acids and a material selected from the group consisting of polyamines and alcamines. It has now been discovered that such resinous binders, which, for convenience, will hereinafter be referred to as primary resin systems, can be improved with respect to increased ultimate strengths and increased shock resistances by the addition of a suitable quantity of monofunctional lower carboxylic acids. For the purposes of the present invention, any saturated, substituted or unsubstituted monocarboxylic acid containing up to about 10 carbon atoms, which is mutually soluble with the primary resin system in a common solvent, or which is soluble in either or both of the principal ingredients of the primary resin system, can be advantageously employed in the present invention. Exemplary of the monocarboxylic acids which can be employed in the present invention to achieve the benefits thereof are formic, acetic, propionic, butyric, pentanoic, octanoic, decanoic, chloroacetic and the like monocarboxylic acids.

A sufficient amount of the monofunctional acid additive is employed to provide an enhanced binder when thermoset in intimate association with an inert filler substance. Generally, in order to obtain the greatest advantage of the present invention, it is necessary to add an amount of the monocarboxylic acid sufficient to provide from about 12 to 50 percent of the total of initially available carboxylic acid groups in the reaction mixture. Usually the greatest improvement in the final thermoset product will be obtained when the amount of the acid additive employed provides from about 20 to 35 percent of the initially available carboxylic acid groups. The optimum quantity of the monofunctional acid additive is affected by the primary resinous composition, the curing conditions and the particular monofunctional acid employed.

In preparing the improved resinous binder various methods can be used to prepare an intermediate resin-forming thermosettable composition from water-soluble coal acids, a monofunctional lower carboxylic acid or mixture thereof, and a polyfunctional material or mixture thereof selected from the group consisting of polyamines and alcamines. In one mode of operation, the water-soluble coal acids and a desired monofunctional carboxylic acid are first mixed in an approximately 60 percent aqueous solution in proportions such that from about 12 to about 50 percent, preferably about 30 percent, of the total carboxylic acid groups present are contributed by the monofunctional acid additive. To this

2 solution is added an approximately equivalent amount of the polyfunctional polyamine and/or alcamine. Lesser or greater amounts than the stoichiometric chemical equivalent of the polyfunctional polyamines and/or alcamines can be used but generally it is desirable to maintain a chemical equivalence ratio from about .5 to 2.0 total equivalents of the functional groups of these materials for each chemical equivalent of carboxylic acid groups present. Chemical equivalence refers to equal numbers of reacting functional groups, and thus at full stoichiometry, the total of amine groups and/or hydroxyl groups present is equal to the number of carboxylic acid groups present. Polyfunctional refers to the presence of more than one primary and/or secondary amino group in the polyamine and to the presence of at least one hydroxyl group and at least one primary or secondary amino group in the alcamine. The improved resinous composition thus produced can be employed in aqueous solution as prepared.

Resinous compositions prepared from the coal acids and polyfunctional amines or alcamines modified with a monofunctional carboxylic acid in accordance with the present invention are thermoset when in intimate association with an inert filler by subjecting them to heat at elevated thermosetting and curing temperatures. The modified resins can be cured with heat supplied at temperatures from about 150° C. to about 400° C. for periods of time between about several minutes and 2 hours depending upon the particular composition and configuration of the structure prepared therefrom. Frequently, the cure times required can be shortened considerably by employing a predrying step prior to the thermosetting stage in which the binder containing composition is predried at temperatures below the thermosetting temperature to remove excess water.

The coal acids that are employed to prepare the improved resinous binders of the invention may be identical with or similar to those which may be obtained by the oxidation with gaseous oxygen, which may be contained in air, of an aqueous alkaline slurry of a finely divided carbonaceous material such as coal or a suitable coke. Coal acids that have been prepared by the nitric acid oxidation of suitable carbonaceous materials are also generally satisfactory. Such coals that are of the varieties known as anthracite, bituminous, sub-bituminous coals as well as lignite and other low grade coals are generally suitable for production of coal acids. Satisfactory cokes are those produced according to conventional techniques from coal at a temperature beneath about 1300° F. The utlization of higher coking temperatures frequently causes the cokes that are obtained to be graphitic and rendered unsuitable for conversion to coal acids in satisfactory yields.

The free coal acids product is a hygroscopic, usually yellowish, essentially water-soluble material that is believed to be substantially comprised of various aromatic polycarboxylic acids. The average molecular weight of the coal acids that are ordinarily obtained is frequently in the neighborhood of 250. Their average equivalent weight is generally about 80 and seldom less than 75 or more than 90. They ordinarily have an average of 2.5 to 5 carboxylic groups per molecule with an average of 3 to 4 being common. While their exact chemical nature and constitution may be somewhat conjectural, they evidently contain considerable quantities of tri- and tetracarboxylic benzene acids as well as aromatic acids having more complex nuclei. Frequently, for example, the greatly preponderant proportion of aromatic nuclei obtained in the described fashion have been found to consist of methylnaphthalene, benzene, biphenyl, naphthalene, phenanthrene, alkyl benzenes and benzophenone nuclei.

The polyfunctional amine compounds or mixtures thereof that are employed in the practice of the invention can be selected from the group of polyamines that are represented by either of the formulae $H_2N-R-NH_2$ and $H_2N-(R-NH-R)_n-NH_2$ wherein R may be any $C_2$ to $C_{10}$ aliphatic or $C_6$ to $C_{14}$ aromatic bivalent radical and $n$ is a whole integer. Other functionally equivalent polyamine compounds such as piperazine and the various substituted piperazines and melamine, in which the nitrogen atoms are part of a heterocyclic molecular structure, may also be utilized provided they contain primary or secondary amino groups. Operable polyamines, which can be employed singly or in mixtures, include hexamethylene diamine, hexamethylene tetramine, ethylene diamine, diethylene triamine, triethylene tetramine and the like.

The alcamine compounds or mixtures thereof with amines or other alcamines that are employed in the practice of the invention can be any aliphatic or alicyclic alkanolamine (which may also have aromatic nuclei in its molecular arrangement) that contains at least one amine group (preferably a seconary amine group) and at least one hydroxyl group in its molecule. Beneficially, the alcamine compounds utilized are selected from one or more of the groups of such compounds that are represented by the formulae $H_2N-R-OH$;

$$HO-R-NH-R-OH$$

and the like and analogous structures wherein each R may independently be any $C_2$ to $C_{12}$ bivalent aliphatic radical. Other functionally equivalent polyfunctional alcamine compounds may also be utilized. Operable alcamines include mono-, di- and triethanolamine and mixtures thereof, propanolamine, butanolamine, 2(2-aminoethylamino) ethanol and the like monoamine and polyamine compounds containing one or more reactive hydroxyl groups.

The coal acids-polyfunctional amine or alcamine resins modified with a monofunctional carboxylic acid are especially desirable for employment as thermosetting binders in which capacity they may be utilized independently or in combination with other ingredients. Thus, they may be employed suitably as the adhesive ingredient in the production of plywood and similar laminate articles of construction. Particular benefit, as mentioned, may be derived when the improved resins are employed as binders for the preparation of composite structures from various inert filler substances including siliceous fillers, carbonaceous fillers (such as graphite, coke breeze, powdered coal and the like) and relatively analogous fillers including mineral and synthetic fibers, asbestos, fly ash, various blast furnace and power-house slags, mica flour, wood flour and the like fibrous or granular substances that are substantially inert to the resin binders and do not melt, fuse excessively or decompose at the thermosetting and curing temepratures which may be involved in the fabrication of the desired composite structures. Exceptional advantages are involved when such inert siliceous filler substances as glass fibers and sand are bound together with the thermoset and cured coal acids adducts of the invention.

The improved resinous binders are particularly useful when applied to glass fibers to provide a thermosettable composite structure. In binding glass fibers, it is generally preferred to apply the modified resinous binder from a relatively dilute solution, advantageously an aqueous solution, that contains between about 5 and 20 percent by weight, and more advantageously from about 6 to 12 percent by weight, based on the total weight of solution of the dissolved resin materials. Enough of the solution should be applied to the mass of glass fibers to be bound to ensure that the desired quantity of the thermoset resin which is formed will be available for binding the fibers, taking into account such factors as solution drain off and the like. A cured resin binder content between about 10 and 15 percent by weight is satisfactory for most glass fiber mats. It is usually beneficial to permit excess quantities of the resin solution to drain off before subjecting the composite mass of improved resin and filler to a suitable thermosetting and curing temperature. Mechanical means such as aspirating or forced draft apparatus may oftentimes be employed with advantage to accelerate the drainage of excess quantities of the solution. The heat that is applied at the curing temperature may ordinarily be used with benefit to dry the applied solution of the improved resin dispersed on the mass of glass fibers prior to or during its cross-linking and thermosetting at the elevated thermal condition. The curing of the applied solution to form the binding resin for the glass fibers may generally be accomplished suitably at temperatures between about 150° and 320° C. for periods of time ranging from about one hour to about two minutes. Curing at 230°–290° C. for 5 to 10 minutes is usually highly satisfactory when a predrying step is employed. The fibrous glass composite structures such as mats, batting, panels and the like that are bound together with the thermoset and cross-linked resinous materials of the invention are strong, relatively rigid, moisture resistant and exceptionally resistant to shock.

Sand compositions, suitable for refractory structures, can be formulated by intimately intermixing with a suitable sand a relatively strong solution, such as an aqueous solution that contains at least about 50 and preferably in the neighborhood of 70 percent or more by weight, based on the weight of the solution, of the dissolved resin. The resin-sand composite compositions may either be fabricated as a wet mix into desired shapes prior to being thermoset or be dried in a dry atmosphere at a non-thermosetting temperature of between about room temperature and 105° C. in order to form a particulate, coated sand composition that may be formed as a dry, free-flowing granular composition into desired structures prior to being completely thermoset.

The cured refractory structures that may be obtained, are generally strong and rigid products. They have high gas permeabilities as well as excellent characteristics of porosity. They have good surface smoothness and dimensional stability which permit fine detail molds and the like for metal casting purposes to be obtained. In addition, the refractory structures that may be obtained by practice of the invention have little tendency to adhere to the surface of the hot metal after it has been cooled and solidified and may be readily stripped or removed therefrom, usually disintegrating easily and cleanly upon sharp impact or with other means for their physical removal.

Any ordinary sand (or other refractory material) that, advantageously, has a fineness in accordance with the values proposed by the American Foundrymen's Society (AFS) which is in the numerical range between about 25 and 180 may be utilized for the preparation of refractory structures bound together with the thermoset, cross-linked improved resin of the invention. Such sands, for example, as the types known as Berkeley Float Sand, Juniata Sand, Lake Sand, Vassar Sand, Wedron Sand, Gratiot Bank Sand, Portage 40–60 Sand and the like may be beneficially employed. It is desirable that the sand be clean and substantially free from foreign metal oxides, clay, moisture and organic matter.

The following examples are representative of the present invention and should not be construed as limiting.

EXAMPLES 1–5

Quantities as specified in the following table of water-soluble coal acids, acetic acid, diethanolamine and water were mixed in a suitable vessel equipped with a stirrer to provide a series of improved coal acid resin formulations. A control formulation without acetic acid was also prepared for comparative purposes. The acetic acid and water-soluble coal acids were dissolved in a sufficient amount of water to provide an ultimate concentrate containing approximately 65 percent acids. Having prepared the aqueous solution of the carboxylic acids, diethanolamine was then added in an amount sufficient to provide a total of hydroxyl and amine functional groups approximately equal to the number of carboxylic acid groups present in the aqueous acid mixture.

The resin-forming compositions thus prepared were added in a sufficient amount to a quantity of Portage Sand AFS number 33 to provide a resin content in the final resin-sand composition of about 6 percent. The composite sand-resin mixtures were then thoroughly mulled by mechanical means and test specimens in the shape of figure eight briquettes were prepared from these compositions by tamping a sufficient quantity into a standard mold form. For the exact shape of the mold form, see Foundry Sand Testing Handbook, 1944 Edition, American Foundrymen's Society (1949), page 86. The test specimens prepared in this manner were cured at a temperature from an initial 165° C. to a final 200° C. for one hour.

The particular resin-forming compositions employed and the tensile test results obtained with standard AFS testing equipment are tabulated below:

Table

| | Control | Test Sample Designation | | | | |
|---|---|---|---|---|---|---|
| | | 1 | 2 | 3 | 4 | 5 |
| Coal Acids (Grams) | 21.2 | 19.5 | 17.7 | 15.9 | 13.9 | 11.8 |
| Acetic Acid (Grams) | 0 | 1.5 | 3.1 | 4.8 | 6.5 | 8.4 |
| Water (Grams) | 12 | 12 | 12 | 12 | 12 | 12 |
| Diethanolamine (Grams) | 8.7 | 8.9 | 9.1 | 9.3 | 9.6 | 9.8 |
| Percent of Initial Carboxylic Groups Contributed by Acetic Acid | 0 | 10 | 20 | 30 | 40 | 50 |
| Tensile Strength of Specimen, p.s.i. | 460 | 435 | 495 | 690 | 570 | 560 |

EXAMPLE 6

In a manner similar to that of the foregoing examples, a resin-forming composition was prepared from 16.9 grams of water-soluble coal acids, 4.9 grams of acetic acid, and 8.4 grams of ethylenediamine in about 12 grams of water. A second resin-forming composition was prepared as a control from about 21 grams of water-soluble coal acids, 7.8 grams of ethylenediamine and about 12 grams of water. As in Example 1, resin-sand formulations containing 6 percent of the improved resin were prepared from the foregoing resin compositions. Test briquettes formed from the sand-resin composite compositions thus prepared were allowed to remain at room temperature for about 60 hours and then cured for about 30 minutes at a temperature ranging from an initial 155° C. to a final 180° C.

The average tensile strength of three test specimens showed that the improved resin, containing as a modifying agent acetic acid, was 120 pounds while that of two control specimens was 78 pounds.

In a manner similar to that of the foregoing examples, other lower monocarboxylic acids selected from the group consisting of propionic, formic, butyric, octanoic and decanoic acids are substituted for the acetic acid in the foregoing examples to achieve an improved resinous binder in accordance with the present invention. Similarly, other alcamines are substituted for the diethanolamines employed in Example 1 such as mono-, di- and triethanolamines, propanolamine, butanolamine and the like monoamine and polyamine compounds containing one or more reactive hydroxyl groups. Also, other polyfunctional amines are substituted for the ethylenediamine of Example 2 such as hexylmethylenetetramine, hexylmethylenetetramine, ethylaminediamine, diethylenetriamine, triethylenetetramine, hexamethylenediamine and the like polyamines. Such substitution of the polyamines and alcamines provides a primary resin system capable of improving modification in accordance with the present invention by means of the addition in the preparatory stage of a mono-functional lower carboxylic acid.

It is to be understood that various modifications may be made in the present invention without departing from the spirit and scope thereof, and the invention is limited only as defined in the claims.

We claim:

1. A composition of matter comprising (a) water-soluble coal acids consisting of aromatic polycarboxylic acids obtained by the oxidation of coal having an average of 2.5 to 5 carboxylic groups per molecule and an average equivalent weight from about 75 to about 90, (b) a polyfunctional compound selected from the group consisting of (1) polyamines having the formulae $$H_2N-R-NH_2$$

and $H_2N-(R-NH-R)_n-NH_2$ wherein R is a radical of the class consisting of 2 to 10 carbon atom hydrocarbon aliphatic radicals and 6 to 14 carbon atom aromatic radicals and $n$ is a whole integer, and (2) alcamines containing at least one reactive amine group and at least one reactive hydroxyl group and (c) a lower saturated monocarboxylic acid containing from 1 to 10 carbons in amounts sufficient to provide about 12 to about 50 percent of the total of initially available carboxylic groups; the amount of component (b) being sufficient to provide from 0.05 to 2.0 chemical equivalents thereof for each chemical equivalent of carboxylic groups present.

2. A composition as in claim 1 wherein the polyfunctional compound is diethanolamine.

3. A composition as in claim 1 wherein the polyfunctional compound is ethylenediamine.

4. A composition as in claim 1 wherein the lower monocarboxylic acid is acetic acid.

5. A composition of matter comprising an inert filler substance in intimate association with a resin-forming composition capable of being thermoset when heated to a temperature between about 150° C. and about 400° C., said resin-forming composition comprising (a) water-soluble coal acids consisting of aromatic polycarboxylic acids obtained by the oxidation of coal having an average of 2.5 to 5 carboxylic groups per molecule and an average equivalent weight from about 75 to about 90, (b) a polyfunctional compound selected from the group consisting of (1) polyamines having the formulae $$H_2N-R-NH_2$$

and $H_2N-(R-NH-R)_n-NH_2$ wherein R is a radical of the class consisting of 2 to 10 carbon atom hydrocarbon aliphatic radicals and 6 to 14 carbon atom aromatic radicals and $n$ is a whole integer, and (2) alcamines containing at least one reactive amine group and at least one reactive hydroxyl group and (c) a lower saturated monocarboxylic acid containing from 1 to 10 carbons in amounts sufficient to provide about 12 to about 50 percent of the total of initially available carboxylic groups; the amount of component (b) being sufficient to provide from 0.05 to 2.0 chemical equivalents thereof for each chemical equivalent of carboxylic groups present.

6. A formed composite structure comprising an inert filler substance in intimate association with a thermoset resin provided as the heat cured reaction product of (a) water-soluble coal acids consisting of aromatic polycarboxylic acids obtained by the oxidation of coal having an average of 2.5 to 5 carboxylic groups per molecule and an average equivalent weight from about 75 to about 90, (b) a polyfunctional compound selected from the group consisting of (1) polyamines having the formulae $H_2N-R-NH_2$ and $H_2N-(R-NH-R)_n-NH_2$ wherein R is a radical of the class consisting of 2 to 10 carbon atom hydrocarbon aliphatic radicals and 6 to 14 carbon atom aromatic radicals and $n$ is a whole integer, and (2) alcamines containing at least one reactive amine group and at least one reactive hydroxyl group and (c) a lower saturated monocarboxylic acid containing from 1 to 10 carbons in amounts sufficient to provide about 12 to about 50 percent of the total of initially available carboxylic groups; the amount of component (b) being sufficient to provide from 0.05 to 2.0 chemical equivalents thereof for each chemical equivalent of carboxylic groups present.

7. A thermoset composition as in claim 6 wherein the inert filler substance is a siliceous material selected from the group of glass and sand.

References Cited in the file of this patent
UNITED STATES PATENTS

| | | |
|---|---|---|
| 2,174,527 | Peterson | Oct. 3, 1939 |
| 2,471,230 | McKeever | May 24, 1949 |
| 2,895,934 | Archer et al. | July 21, 1959 |
| 2,895,936 | Archer et al. | July 21, 1959 |